(12) United States Patent
Engelbert et al.

(10) Patent No.: US 8,791,954 B2
(45) Date of Patent: Jul. 29, 2014

(54) SYSTEMS AND METHODS FOR COMBINING IMAGES INTO A FILE USING MULTIPLE COLOR PALETTES

(75) Inventors: Joshua Engelbert, Littleton, CO (US); Bill Ivanich, Parker, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

(21) Appl. No.: 13/618,853

(22) Filed: Sep. 14, 2012

(65) Prior Publication Data

US 2013/0009978 A1  Jan. 10, 2013

Related U.S. Application Data

(63) Continuation of application No. 12/486,695, filed on Jun. 17, 2009, now Pat. No. 8,284,212.

(51) Int. Cl.
*G09G 5/02* (2006.01)
*G06K 9/00* (2006.01)

(52) U.S. Cl.
USPC ........... 345/602; 345/589; 345/601; 382/162; 382/166

(58) Field of Classification Search
None
See application file for complete search history.

(56) References Cited

U.S. PATENT DOCUMENTS

| | | | |
|---|---|---|---|
| 5,459,486 A | 10/1995 | Iverson et al. | |
| 5,611,027 A * | 3/1997 | Edgar | 715/853 |
| 6,388,675 B1 * | 5/2002 | Kamada et al. | 345/600 |
| 7,843,465 B1 | 11/2010 | Shaick | |
| 2005/0179697 A1 * | 8/2005 | Shih et al. | 345/602 |
| 2006/0158457 A1 * | 7/2006 | Herrick et al. | 345/589 |
| 2006/0242416 A1 | 10/2006 | Sharma et al. | |
| 2008/0273804 A1 | 11/2008 | Malewski | |
| 2009/0010533 A1 | 1/2009 | Hung | |

* cited by examiner

*Primary Examiner* — Maurice L McDowell, Jr.
*Assistant Examiner* — Donna J Ricks
(74) *Attorney, Agent, or Firm* — Lowe Graham Jones PLLC

(57) ABSTRACT

Image data systems and methods combine a plurality of images into a single multiple-palette image data file, or generate a selected image from the multiple-palette image data file. An exemplary embodiment receives first pixel information for a first pixel of a first image, the first pixel having a first color; receives second pixel information for a like-located second pixel of a second image, the second pixel having a second color; and specifies a color palette location value that identifies a first color palette array element in a first color palette of the first image and identifies a second like-located color palette array element in a second color palette of the second image. First color information stored in the first color palette array element defines the first pixel color. Second color information stored in the second image data color palette array element defines the second pixel color.

16 Claims, 5 Drawing Sheets

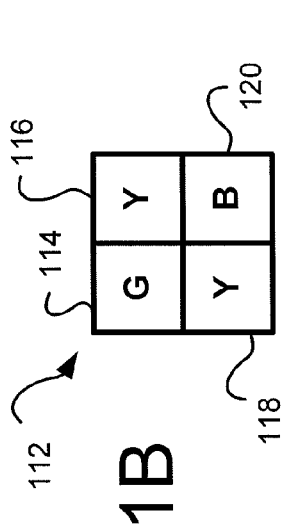
FIG. 1A
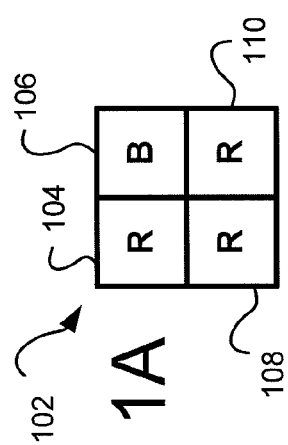
FIG. 1B
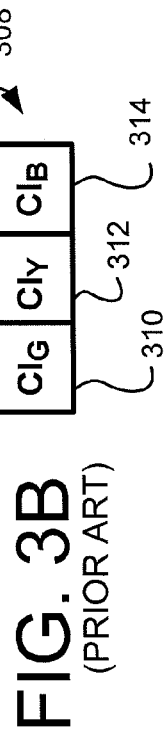
FIG. 2A (PRIOR ART)
FIG. 2B (PRIOR ART)
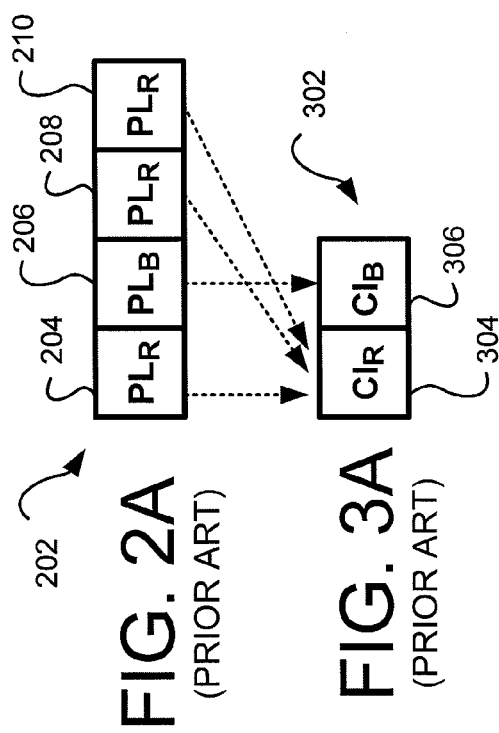
FIG. 3A (PRIOR ART)
FIG. 3B (PRIOR ART)

| IMAGE DATA ARRAY ELEMENT | FIRST COLOR PALETTE ARRAY ELEMENT | SECOND COLOR PALETTE ARRAY ELEMENT |
|---|---|---|
| $PL_1$ (632) | $Cl_R$ (632a) | $Cl_G$ (632b) |
| $PL_2$ (634) | $Cl_B$ (634a) | $Cl_Y$ (634b) |
| $PL_3$ (636) | $Cl_R$ (636a) | $Cl_Y$ (636b) |
| $PL_4$ (638) | $Cl_R$ (638a) | $Cl_B$ (638b) |

FIG. 7 ⤺ 702

800 ⤵  ⤳802  ⤳804  ⤳806  ⤳808
[HEADER] [PAL 1] [PAL 2] [IMAGE DATA ARRAY]

SYSTEMS AND METHODS FOR COMBINING IMAGES INTO A FILE USING MULTIPLE COLOR PALETTES

PRIORITY CLAIM

This patent application is a Continuation of U.S. Non-Provisional patent application Ser. No. 12/486,695, filed Jun. 17, 2009, published as U.S. Publication No. 2010/0321401, and entitled "SYSTEMS AND METHODS FOR COMBINING IMAGES INTO A FILE USING MULTIPLE COLOR PALETTES," the content of which is herein incorporated by reference in its entirety.

BACKGROUND

Rendered, pixel-based image files include a file header, a color palette, and an image data array. Such pixel-based images may be relatively large, and thus require a substantial portion of space in a memory medium. An exemplary image data file format could be constructed as:

Image=[HEADER][PALETTE][IMAGE DATA ARRAY]

The file header of the pixel-based image includes various information pertaining to the image, such as bitmap width in pixels (the number of pixels in a row of pixels), bitmap height in pixels (the number of pixels in a column of pixels), and number of bits used to define the color of a pixel. For example, if eight (8) bits are used to specify the color of a pixel, then there are a possible 256 different colors that may be used to define pixel color. Any suitable number of bits may be used to define the number of color choices for a pixel (for example, if twelve bits are used, up to 4096 colors are available to define the color for a pixel).

A color palette is a pre-defined, ordered array of elements that define a color value. Each color value includes color information to define the different colors that may be used to color a pixel. For example, the color information specifies a mixture of red, green, and blue colors, along with an intensity value and/or color depth value. The color palette location information defines the location of each array element of the color palette. Accordingly, individual colors of the color palette are indexed by their location in the color palette, and thus are identified by their unique color palette location value.

The image data array is a pre-defined, ordered array of elements that define the image on a pixel-by-pixel basis. For any particular image, the location of a pixel can be identified by its relative location in the image data array since there are n×m pixels in the image data array (where n is the number of pixels in a row of pixels and m is the number of pixels in a column of pixels). Thus, the relative location of the pixel data in the image data array defines the location of the pixel in the image.

The information in any particular array element of the image data array is one of the color palette location information values. Thus, each array element in the image data array points to a particular array element in the color palette (which has the color information for a particular color).

When the image is displayed and/or printed, each of the individual pixels of the image are displayed and/or printed. To print and/or display an individual pixel, the location of the pixel in the image is first determined based upon its relative location in the image data array. For each pixel, the array element of the image data array is retrieved for mapping to the color palette. Thus, the color palette location information retrieved for that pixel maps to the color for that particular pixel. Accordingly, the color information for that pixel is retrieved. That is, since the array element of the image data array specifies the color palette location value of a color in the color palette, the color information for that pixel is retrieved from the color information stored in the color palette for that particular pixel.

Since the same color may be used for many hundreds of pixels in an image, or even thousands of pixels in an image, the size of the rendered image is considerably reduced when the color of each individual pixel is defined by the color palette location value of the color palette. However, an image that uses a large number of pixels, such as a high resolution image and/or a large image, requires a relatively large portion of the memory medium during processing. Often, the image is stored in a writable and/or volatile memory, such as a disk drive, a flash memory, or the like.

Often, a plurality of similar images, or similar-sized images, are concurrently stored in the memory. Thus, a large portion of the memory may be required for image data management. Accordingly, there is a need in the industry to compress image data so as to reduce memory requirements.

SUMMARY

Systems and methods of combining information for a plurality of images into a single multiple-palette image data file are disclosed. An exemplary embodiment receives first pixel information for a first pixel of a first image, the first pixel having a first color; receives second pixel information for a like-located second pixel of a second image, the second pixel having a second color; and specifies a color palette location value. The color palette location value identifies a first color palette array element in a first color palette associated with the first image. The color palette location value identifies a second like-located color palette array element in a second color palette associated with the second image. First color information stored in the first color palette array element defines the first color for the first pixel. Second color information stored in the second image data color palette array element defines the second color for the second pixel.

In accordance with further aspects, an exemplary embodiment generates an image selected from a multiple-palette image data file, wherein the multiple-palette image data file defines a plurality of images and comprises a header, a plurality of color palettes for each one of the corresponding plurality of images, and an image data array, wherein the image data array is a pre-defined, ordered array of elements that commonly defines each of the plurality of images on a pixel-by-pixel basis. The exemplary embodiment retrieves a first color palette location value from a first one of a plurality of image data array elements of the image data array, wherein a location of the first image data array element corresponds to a location of a first pixel of the selected image, and wherein the first color palette location value defines a location of a first color palette array element in a color palette that is associated with the selected image; retrieves first color information from the first color palette array element; and generates the first pixel of the selected image based upon a location of the first image data array element and the retrieved first color information.

BRIEF DESCRIPTION OF THE DRAWINGS

Preferred and alternative embodiments are described in detail below with reference to the following drawings:

FIGS. 1A-1B illustrate two simplified pixel-based images each having four pixels;

FIGS. 2A-2B illustrate simplified hypothetical image data arrays for the rendered images of FIGS. 1A-1B;

FIGS. 3A-3B illustrate simplified hypothetical color palettes for the rendered images of FIGS. 1A-1B

FIG. 7 illustrates the mapping of color palette locations for each of the two images of the FIGS. 6A-6C;

DETAILED DESCRIPTION

Figure 4:
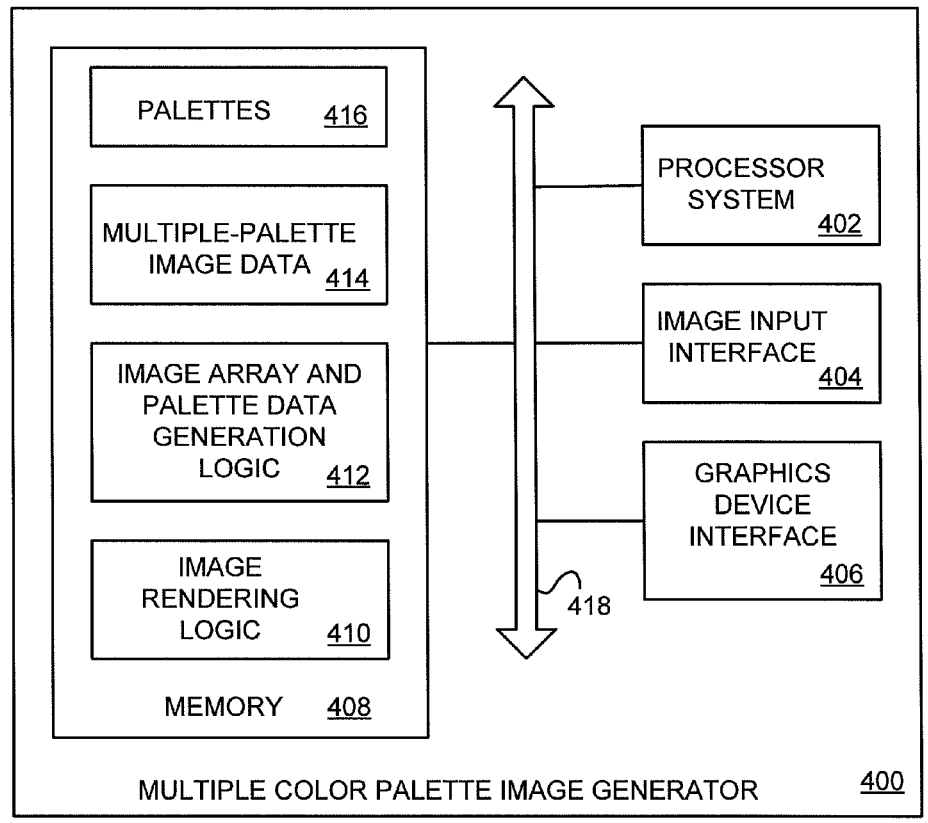
FIG. 4 is a block diagram of an embodiment of the multiple color palette image generator.

Embodiments of the multiple color palette image generator are configured to generate a single image data file representative of multiple images by associating each one of the multiple images with its own color palette. Thus, the same image data array, which is typically larger than a color palette, may be used to represent multiple images.

FIGS. 1A and 1B illustrate simplified pixel-based images each having four pixels. The first image 102 has four colored pixels, a red pixel 104 (R), followed by a blue pixel 106 (B), followed by a second red pixel 108 (R), and finally ending with a third red pixel 110 (R). The second image 112 also has four colored pixels, a green pixel 114 (G), followed by a yellow pixel 116 (Y), followed by a second yellow pixel 118 (Y), and finally ending with a blue pixel 120 (B).

FIG. 2A graphically represents a prior art image data array 202 for the first image 102. FIG. 3A graphically represents a prior art color palette 302 for the first image 102. For the simplified image 102, the image information would include a header with information indicating that the image 102 is an m-by-n pixel array (here a 2×2 pixel array), where m=2 and n=2.

The image data array 202 would have four array elements, one for each of the pixels 104, 106, 108 and 110 of the first image 102. In this simplified example, the red pixel 104 is the first array element 204 in the image data array 202. Thus, the location of the first pixel 104 (upper left hand corner) is known by virtue of its corresponding array element 204 being in the first position of the image data array 202. Since the array element 206 for the second pixel 106 is the second position in the image data array 202, the location of the pixel 106 in the image 102 is also known (upper right hand corner). Similarly, the locations of the third pixel 108 (lower left hand corner) and the fourth pixel 110 (lower right hand corner) are known by virtue of the position of their array elements 208, 210, respectively, in the image data array 202.

In this simplified example, the image 102 has two colors, red and blue. Thus, its corresponding color palette 302 has two array elements with color information therein. The first color palette array element 304 includes color information ($CI_R$) that defines the color red. The second color palette array element 306 includes color information ($CI_B$) that defines the color blue.

The information stored in the array elements of the image data array 202 is the color palette location value (PL) that identifies the location of the array element in the color palette 302 having the desired color for each of the pixels 104, 106, 108, and 110. Accordingly, the array element 204 in the image data array 202 (which corresponds to the first red colored pixel 104 that is located in the upper left hand corner of the image 102) has the color palette location value ($PL_R$) that identifies the location of the color palette array element 304. The color palette location value ($PL_R$) is a suitable pointer value, index value, or the like that is used to map to the color palette 302 so that the information defining the color red ($CI_R$) can be retrieved from the color palette 302.

Similarly, the array element 206 in the image data array 202 (which corresponds to the blue colored pixel 106 that is located in the upper right hand corner of the image 102) has the color palette location value ($PL_B$) that identifies the location of the color palette array element 306. The color palette location value ($PL_B$) is a suitable pointer value, index value, or the like that is used to map to the color palette 302 so that the information defining the color blue ($CI_B$) can be retrieved from the color palette 302.

The array elements 208, 210 in the image data array 202 (which corresponds to the red colored pixels 108, 110 that are located in the bottom left hand and right hand corners of the image 102, respectively) have the color palette location value ($PL_R$). Thus, the same color palette location value ($PL_R$) maps to the color palette array element 304 so that the information defining the color red ($CI_R$) can be retrieved from the color palette 302.

A second simplified example for the second image 112 is presented to contrast the image data array 202 and the color palette 302 for the first image 102. Here, FIG. 2C graphically represents a prior art image data array 212 for the second pixel-based image 112. FIG. 3A graphically represents a prior art color palette 308 for the second image 112. For the simplified second image 112, the image data would have a header that includes information indicating that the second image 112 is also an m-by-n pixel array (here a 2×2 pixel array), where m=2 and n=2.

The image data array 212 would have four array elements, one for each of the pixels 114, 116, 118 and 120 of the second image 112. In this simplified example, the location of the pixels 114, 116, 118 and 120 is known by virtue of their location in the corresponding array data 214.

In this simplified example, a second image 112 has three colors; green, yellow, and blue. Thus, its corresponding color palette 308 has three array elements. The first array element 310 includes color information ($CI_G$) that defines the color green. The second array element 312 includes color information ($CI_Y$) that defines the color yellow. The third array element 314 includes color information ($CI_B$) that defines the color blue.

The information stored in each of the array elements of the image data array 212 indicates the color palette location value (PL) in the color palette 308 for the each of the pixels 114, 116, 118, and 120. Accordingly, the array data 214 in the image data array 212 (which corresponds to the first green colored pixel 114 that is located in the upper left hand corner of the second image 112) has the color palette location value ($PL_G$) mapping to the location of the array element 310 so that the information defining the color green ($CI_B$) can be retrieved from the color palette 308.

Similarly, the array elements 216 and 218 in the image data array 212 (which correspond to the yellow colored pixels 116, 118) each have a color palette location value ($PL_Y$) that maps to the array element 312 in the color palette 308. The color palette location value ($PL_Y$) is a suitable pointer value, index value, or the like that is used to map to the color palette 308 so that the information defining the color yellow ($CI_Y$) can be retrieved from the color palette 308. Finally, the array element 220 in the image data array 212 (which corresponds to the blue colored pixel 120 that is located in the lower right hand corner of the image 112) has the color palette location value ($PL_B$) that maps to the array element 314. The color palette location value ($PL_B$) is a suitable pointer value, index value, or the like that is used to map to the color palette 308 so that the information defining the color blue ($CI_B$) can be retrieved from the color palette 308.

In the above simplified example of the image data for the image 102, the colors for the entire image 102 can be represented by the color palette 302 which has only two entries. Similarly, the colors for the image data for the second image 112 can be represented by the color palette 308, which has only three entries. Their image data files may be generally represented as follows:

Image 102=[HEADER 1][PALETTE 302][IMAGE DATA ARRAY 202]

Image 112=[HEADER 2][PALETTE 308][IMAGE DATA ARRAY 212]

In practice, it is appreciated that when the two images 102, 112 have many thousands of pixels (instead of the four exemplary pixels). When many hundreds of pixel colors are used in coloring the pixels of the images 102, 112, the actual size of the image data for the images 102, 112 will be very large. The largest portion of such image data files is the relatively large size image data arrays 202, 212.

Figure 5:
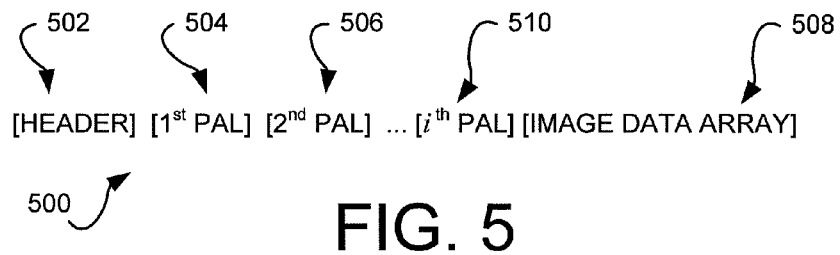
FIG. 5 is a conceptual format of a multiple-palette image data file.

FIG. 4 is a block diagram of an embodiment of the multiple color palette image generator 400. FIG. 5 is a conceptual format of a multiple-palette image data file 500. The multiple-palette image data file 500 representing the exemplary first image 102 and the exemplary second image 112 generated by embodiments of the multiple color palette image generator 400 may be generally represented as follows:

Image=[HDR][$1^{st}$ PAL][$2^{nd}$ PAL] ... [$i^{th}$ PAL][IMAGE DATA ARRAY]

Thus, the generated multiple-palette image data file 500 includes a header 502 (HDR), a first color palette 504 ($1^{st}$ PAL), a second color palette 506 ($2^{nd}$ PAL), and an image data array 508. If more than two images are represented in the multiple-palette image data file 500, additional color palettes 510 ($i^{th}$ PAL) are included. All of the represented images use the same image data array 508. Each image has its own unique color palette.

Embodiments of the multiple color palette image generator 400 are configured to generate the multiple-palette image data file 500 representative of multiple images by associating each one of the multiple images with its own color palette. For example, a multiple-palette image data file 500 would be generated to represent the first image 102 and the second image 112 (FIGS. 1A and 1B, respectively). Thus, a single image data array and two color palettes are be used to represent the multiple images 102, 112.

The size of the multiple-palette image data file 500 is considerably smaller than the size of the two prior art data files used to separately represent the first image 102 and the second image 112 since a single image data array 508 is used for all images included in the multiple-palette image data file 500. For example, a multiple-palette image data file 500 representing two images may be generally represented as follows:

Image=[HEADER][$1^{st}$ PALETTE][$2^{nd}$ PALETTE] [IMAGE DATA ARRAY]

The exemplary multiple color palette image generator 400 (FIG. 4) comprises a processor system 402, an image input interface 404, a graphics device interface 406, and a memory 408. The memory 408 includes portions for storing the image rendering logic 410, the image array and palette data generation logic 412, the generated multiple-palette image data 414, and one or more optional palettes 416.

In the illustrated exemplary embodiment, the processor system 402, the image input interface 404, the graphics device interface 406, and the memory 408 are communicatively coupled to each other via a communication bus 418, thereby providing connectivity between the above-described components. In alternative embodiments of the multiple color palette image generator 400, the above-described components may be communicatively coupled to each other in a different manner. For example, one or more of the above-described components may be directly coupled to the processor system 402, or may be coupled to the processor system 402 via intermediary components (not shown). Further, additional components (not shown) may be included in alternative embodiments of the multiple color palette image generator 400. Alternatively, or additionally, embodiments of the multiple color palette image generator 400 may be integrated into a multifunction device which performs other operations.

The image input interface 404 receives image information from a remote source (not shown). The received image information defines a plurality of images that are to be combined into the multiple-palette image data file 500 by embodiments of the multiple color palette image generator 400. For example, the image input interface 404 may receive the image information from a remote memory, an image capture device such as a camera or the like, or another suitable device. The image information may be saved into the memory 408, and/or may be directly processed into a multiple-palette image data file 500. The received image information may be in any suitable format, such as a pixel-based image format or another, non pixel-based image format.

The graphics device interface 406 communicates the generated multiple-palette image data file 500 to an external device (not shown). For example, the external device may be a printer or the like that prints one or more of the plurality of images determinable from the multiple-palette image data file 500. As another example, the external device may be a set top box, television, personal computer, laptop computer, personal device assistant, cellular phone or the like that displays an image of one or more of the plurality of images determinable from the multiple-palette image data file 500. As another example, the external device may be a special purpose, or a general purpose, computing system that further processes one or more of the plurality of images determinable from the multiple-palette image data file 500. Alternatively, embodiments of the multiple color palette image generator 400 may be integrated into any suitable external device that processes one or more of the plurality of images determinable from the multiple-palette image data file 500.

The image rendering logic 410 receives image information and generates pixel-based image information for each of the images that are to be combined into a single multiple-palette image data file 500. Pixel-based image information may be directly processed into the multiple-palette image data file 500, or stored into memory 408 for later processing.

In some instances, pixel-based image information may be available from remote sources. Such pixel-based image information may be received over the image input interface 404, and then directly processed into the multiple-palette image data file 500, and/or stored into memory 408 for later processing.

The image array and palette generation logic 412 receives the pixel-based image information and generates, using a plurality of pixel-based images, a single multiple-palette image data file 500. The generated multiple-palette image data file 500 is saved into the multiple-palette image data 414 portion of memory 408 for later use in displaying images and/or printing images.

The pixel-based image information (generated by the image rendering logic 410, retrieved from memory 408, or received from a remote source) comprises three components: the header, two or more color palettes, and a single image data array. However, alternative embodiments may include other information and/or components.

The header, as noted above, contains information describing the pixel-based image information, such as the image size (number of m pixels in a pixel row, number of n pixels in a pixel column). The plurality of color palettes contains color information corresponding to the color of its corresponding image pixels.

In some instances, one of a plurality of standardized color palettes may be used for obtaining color information that is stored into the generated color palettes. Such standardized color palettes may be included in the pixel-based image information, or may reside in the palettes 416 portion of memory 408. In other instances, the originally received pixel-based image information includes a color palette for that particular image.

The image data array includes a plurality of color palette location values (PLs). A color palette location value is a suitable pointer value, index value, or the like that is used to map to the color palette so that the information defining the pixel color can be retrieved from the respective color palette of an image that is currently being displayed and/or printed.

The process of generating a multiple-palette image data file 500 from a plurality of pixel-based images begins with identification of the pixel-based images that are to be combined into a single multiple-palette image data file 500. Preferably, the sizes of the selected pixel-based images are the same or similar. The corresponding images themselves need not be the same, and may use color information from different color palettes.

Then, on a pixel-by-pixel basis, the image array and palette generation logic 412 constructs a single image data array 508 and a color palette for each of the images. The single image data array 508 maps each pixel of each image to a unique color palette that is generated for each of the pixel-based images that are being combined into the multiple-palette image data file 500. For example, if two pixel-based images are being combined, a first color palette will be generated for the first image and a second color palette will be generated for the second image. The two unique color palettes are generated concurrently as each pixel of the two images are processed into the image data array 508.

Figure 6A:
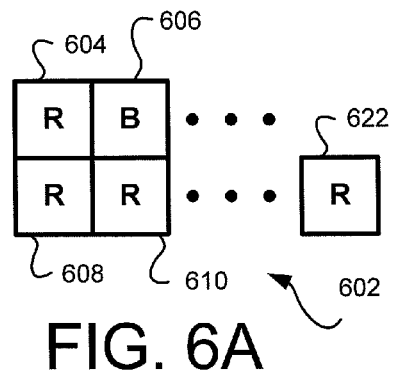
FIGS. 6A-6B illustrate portions of two simplified pixel-based images.
Figure 6B:
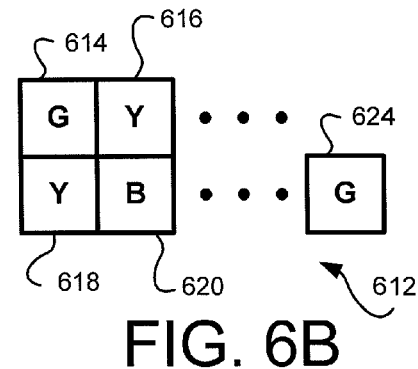

FIG. 6A illustrates a portion 602 of a first simplified pixel-based image having four adjacent pixels 604, 606, 608, 610. FIG. 6B illustrates a portion 612 of a second simplified pixel-based image having four adjacent pixels 614, 616, 618, 620. The portion 602 of the first image also includes a fifth pixel 622 that is on the same pixel row as the pixels 608, 610. The pixel 622 is separated by other pixels (not shown) from the pixel 610. Similarly, the portion 612 of the second image illustrates a fifth pixel 624 that is on the same pixel row as the pixels 618, 620. The pixel 624 is separated by other pixels (not shown) from the pixel 620.

For the purposes of this simplified example where two pixel-based images are combined into a single multiple-palette image data file 500, it is assumed that the size of the two images are substantially the same. That is, both images may be characterized as an array of m-by-n pixels (where m is the number of pixels in a pixel row and where and n is the number of pixels in a pixel column). More particularly, it is assumed that the locations of the pixels 604, 606, 608, 610 and 622 in the first image are the same as the respective locations of the pixels 614, 616, 618, 620 and 624 in the second image.

Figure 6C:
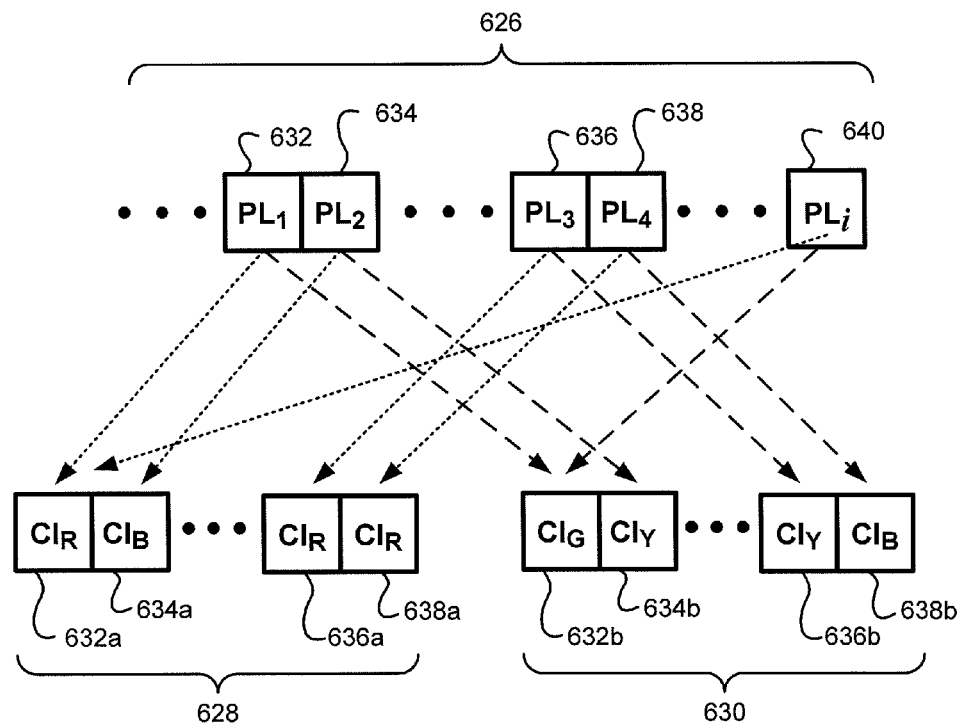
FIG. 6C illustrates a single image data array and two color palettes generated by embodiments of the multiple color palette image generator.

FIG. 6C illustrates mapping of array elements in the single image data array 626 to portions of two generated color palettes 628 and 630. As noted above, the pixels of the first image and the second image are concurrently processed on a pixel-by-pixel basis, where the location of the concurrently processed pixels are the same in their respective images. As the like-located pixels are concurrently processed, a corresponding array element of the image data array 626, and the array elements of the corresponding unique color palettes, are concurrently generated.

For example, assume that the pixel 604 of the first image is concurrently processed, or substantially concurrently processed, with the like-located pixel 614 the second image. In this simplified example, the color of the pixel 604 is red and the color of the pixel 614 is green. The array element 632 of the image data array 626 is generated by adding a color palette location value ($PL_1$). The color palette location value ($PL_1$) identifies the same respective location of the like-located color palette array elements 632a, 632b in the two generated color palettes 628 and 630.

Here, color information is stored in the array element 632a of the first color palette 628. The stored color information corresponds to the red colored pixel 604 of the first image. Thus, array element 632a has red color information ($CI_R$) stored therein. Accordingly, when the color information ($CI_R$) is retrieved when the first image is displayed and/or printed, the pixel 604 will be red (in accordance with the color information $CI_R$).

Similarly, the color information is stored in the like-located array element 632b of the second color palette 630. The stored color information corresponds to the green colored pixel 614 of the second image. Thus, array element 632b has green color information ($CI_G$) stored therein. Accordingly, when the color information ($CI_G$) is retrieved when the second image is displayed and/or printed, the pixel 614 will be green (in accordance with the color information $CI_G$).

Next, the array elements for the image data array 626 and the two color palettes 628 and 630 are generated for the next pixel 606 in the first image (a blue colored pixel) and the next like-located pixel 616 in the second image (a yellow colored pixel). This next array element 634 of the image data array 626 is generated by adding a color palette location value ($PL_2$). The color palette location value ($PL_2$) identifies the same respective location of the like-located color palette array elements 634a, 634b in the two generated color palettes 628 and 630.

Here, the color information in the array element 634a of the first color palette 628, corresponding to the first image (and thus, corresponding to the pixel 606), has blue color information ($CI_B$) therein. Similarly, the color information in the array element 634b of the second color palette 630, corresponding to the second image (and thus, corresponding to the pixel 616), has yellow color information ($CI_Y$) therein. Accordingly, when the color information ($CI_B$) is retrieved when the first image is displayed and/or printed, the pixel 606 will be blue (in accordance with the color information $CI_B$). Similarly, when the color information ($CI_Y$) is retrieved when the second image is displayed and/or printed, the pixel 616 will be yellow (in accordance with the color information $CI_Y$).

Then, the like-located pixels in the first and second images (not shown) that are adjacent to the pixels 606, 616, respectively, are processed by the image array and palette generation logic 412 to generate the information in the image data array 626 and the two color palettes 628 and 630. The process of generating information for the image data array 626 and the two color palettes 628 and 630 continues on a pixel-by-pixel basis.

At some point, the red colored pixel 608 of the first image and the yellow colored pixel 618 of the second image are concurrently processed. Even though the previously generated array element 632 of the image data array 626 maps to color information for a red colored pixel (at array element 632a in the color palette 628), and the previously generated array element 634 of the image data array 626 maps to color information for a yellow colored pixel (at array element 634b in the color palette 630), these color palette locations cannot be used since a single array element in the image data array 626 can only point to a single location in a color palette.

Thus, new array elements in the image data array 626 and the two color palettes 628 and 630 for the like-located pixels 606 and 616, respectively, must be generated. This next array element 636 of the image data array 626 is generated by adding a color palette location value ($PL_3$). The color palette location value ($PL_3$) identifies the same respective location of the like-located color palette array elements 636a, 636b in the two generated color palettes 628 and 630. Here, the color information in the array element 636a, corresponding to the first image (and thus, corresponding to the pixel 608), has red color information ($CI_R$) therein. Similarly, the color information in the like-located array element 636b, corresponding to the second image (and thus, corresponding to the pixel 618), has yellow color information ($CI_Y$) therein. Accordingly, when the color information ($CI_R$) is retrieved when the first image is displayed and/or printed, the pixel 608 will be red (in accordance with the color information $CI_R$). Similarly, when the color information ($CI_Y$) is retrieved when the second image is displayed and/or printed, the pixel 618 will be yellow (in accordance with the color information $CI_Y$).

Next, the red colored pixel 610 of the first image and the like-located blue colored pixel 620 of the second image (which are adjacent to the previously processed pixels 608, 618, respectively) are concurrently processed to generate array elements in the image data array 626 and the two color palettes 628 and 630. This next array element 638 of the image data array 626 is generated by adding a color palette location value ($PL_4$). The color palette location value ($PL_4$) identifies the same respective location of the color palette array elements 638a, 638b in the two generated color palettes 628 and 630. Here, the color information in the array element 638a, corresponding to the first image (and thus, corresponding to the pixel 608), has red color information ($CI_R$) therein. Similarly, the color information in the like-located array element 638b, corresponding to the second image (and thus, corresponding to the pixel 618), has blue color information ($CI_B$) therein. Accordingly, when the color information ($CI_R$) is retrieved when the first image is displayed and/or printed, the pixel 610 will be red (in accordance with the color information $CI_R$). Similarly, when the color information ($CI_B$) is retrieved when the second image is displayed and/or printed, the pixel 620 will be blue (in accordance with the color information $CI_B$).

It is appreciated that each array element of the image data array 626 points to a location in the first color palette 628 having color information for a particular color therein. The same array element also points to the same respective location in the second color palette 630 having color information for a particular color therein. Most likely, the color information will be different for the generated color palettes, though they may be the same. In any event, given that two images are being combined into a single multiple-palette image data file 500, each array element in the image data array 626 identifies a common location in the two generated color palettes 628 and 630. In the above example, the color palette location defined by the array element 632 is associated with the color information in the color palette array element 632a (for the red color of pixel 604) and the color information in the color palette array element 632b (for the green color of pixel 614).

FIG. 7 is a table illustrating the mapping of color palette locations for each of the array elements of the above-described example. Thus, color information sets 702 become apparent for each array element in the generated image data array 626. Here, each of the color information sets 702 has two like-located color palette array elements since two images are being combined into the multiple-palette image data file in this simplified example. Furthermore, it is appreciated that so far in the above simplified example of generating a multiple-palette image data file for two images, that each of these color information sets 702 are different. It is further appreciated that if more than two images are being combined into a single multiple-palette image data file, the color information sets will have a number of elements corresponding to the number of combined images.

At some point in the processing of like-located pixels, it is probable that there will be a reoccurrence of a previously defined color information set 702. Returning to the above example where two images are combined into a single multiple-palette image data file, assume that there is a red colored pixel 622 in the first image and a like-located green colored pixel 624 in the second image. When these two like-located pixels 622, 624 are concurrently processed, the generated array element 640 in the image data array 626 needs to map to red color information (for the red colored pixel 622) and to green color information (for the green colored pixel 624). Thus, a color information set of $CI_R$ (in the first color palette 628) and $CI_G$ (mapped to the second color palette 630) is required to define color information for the like-located pixels 622, 624, respectively.

However, this color information set has already been generated and saved into the array element 632 as $PL_1$ (for the like-located pixel pair 604, 614). Thus, the array element 640 may use the color palette location information $PL_1$ to specify the red color information for the red colored pixel 622 and to specify the green color information for the green colored pixel 624.

Figure 8:
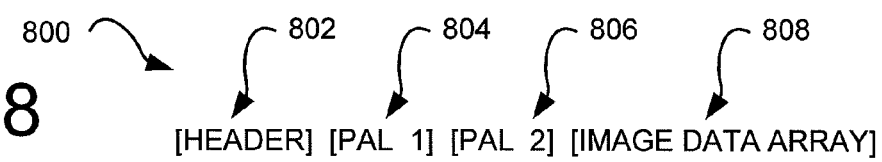
FIG. 8 illustrates an exemplary format of the generated multiple-palette image data file for the two images of the FIGS. 6A-6C.

Once all like-located pixels of the first and second images have been concurrently processed, a single multiple-palette image data file will have been generated. FIG. 8 illustrates a non-limiting, exemplary format of the generated multiple-palette image data file 800. The multiple-palette image data file 800 has a header 802 that defines general information about the two images, such as the image size. A first color palette (PAL 1) 804 defines colors used for pixels of the first image. A second color palette (PAL 2) 806 defines colors used for pixels of the second image. A single image data array 808 maps to locations in the first color palette 804 and the second color palette 806 for each of the pixels in the first and second images.

When the first image is specified for display and/or printing, the header 802, the first color palette 804, and the image data array 808 are used to generate the first image. When the second image is specified for display and/or printing, the header 802, the second color palette 806, and the image data array 808 are used to generate the second image. Thus, a single multiple-palette image data file defines two different images. This single multiple-palette image data file requires less memory space than the prior art separate image data files.

When the size of images and/or when the images themselves are quite different, it may not be possible to generate a single multiple-palette image data file for those images because of limited color palette dimensions. In those situations where it is possible to generate a single multiple color palette image for multiple images that are of different, and/or that have different sizes, the size of the generated multiple-palette image data file may result in significant memory capacity savings.

Figure 9A:
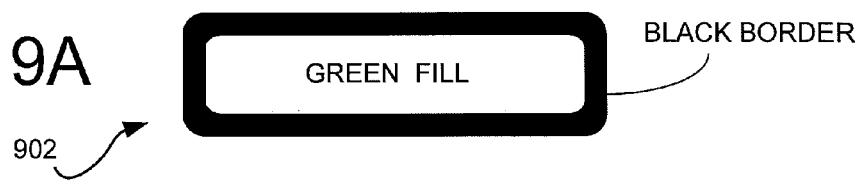
FIGS. 9A-G conceptually illustrate generation of a single multiple-palette image data file for three virtual buttons.
Figure 9B:
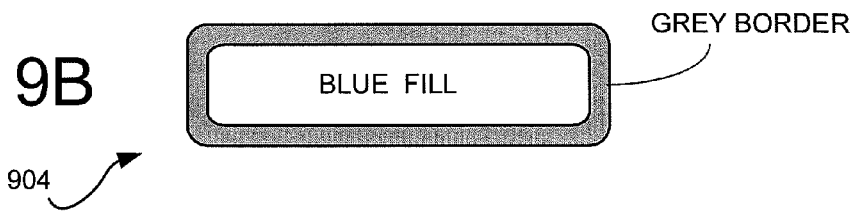
Figure 9C:
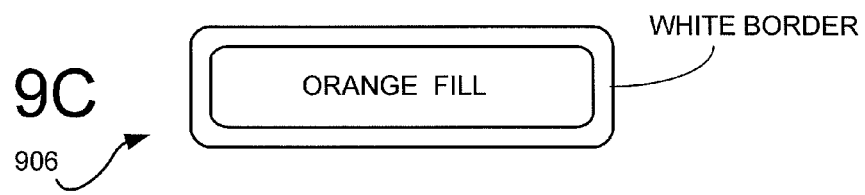

FIGS. 9A-9B illustrate images of three virtual buttons 902, 904, and 906 that may be shown on a graphical user interface. The virtual buttons 902, 904, and 906 have the same size and form in this example. The difference between the virtual buttons 902, 904, and 906 is in their colors. The virtual button 902 is defined by a black border and a green colored fill region. The virtual button 904 is defined by a grey border and a blue colored fill region. The virtual button 906 is defined by a white border and a orange colored fill region.

In this simplified example, embodiments of the multiple color palette image generator 400 will process pixel-based images of the three virtual buttons 902, 904, and 906 into a single multiple-palette image data file. Since the borders and the fill areas of the virtual buttons 902, 904, and 906 have the same dimensions, and since only two colors are used for the pixels of the virtual buttons 902, 904, and 906, three virtual buttons 902, 904, and 906 can use a single image data array that maps to a two-element color palette.

Figure 9D:
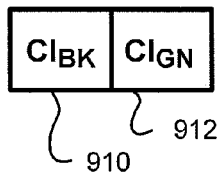

For example, each pixel of the first virtual button 902 will be either black or green colored. Thus, a first two-element color palette 908 having an array element 910 with black color information ($CI_{BK}$) and an array element 912 with green color information ($CI_{GR}$) may be used to define pixel colors for the first virtual button 902, as illustrated in FIG. 9D.

Figure 9E:
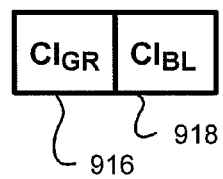

Similarly, each pixel of the second virtual button 904 will be either grey or blue colored. Thus, a second two-element color palette 914 having an array element 916 with grey color information ($CI_{GR}$) and an array element 918 with blue color information ($CI_{BL}$) may be used to define pixel colors for the second virtual button 904, as illustrated in FIG. 9E.

Figure 9F:
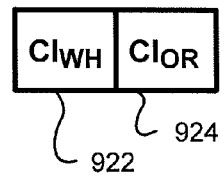

Each pixel of the third virtual button 906 will be either white or orange colored. Thus, a two-element color palette 920 having an array element 922 with white color information ($CI_{WH}$) and an array element 924 with green color information ($CI_{OR}$) may beused to define pixel colors for the third virtual button 906, as illustrated in FIG. 9F.

Here, there will be two different color information sets, each characterized by three elements (one for each of the three virtual buttons 902, 904, and 906). One color information set would be $CI_{BK}$, $CI_{GR}$, and $CI_{WH}$. The other color information set would be $CI_{GN}$, $CI_{BL}$, and $CI_{OR}$. All of the pixels of the virtual buttons 902, 904, and 906 can be mapped to one of these two different color information sets.

Figure 9G:
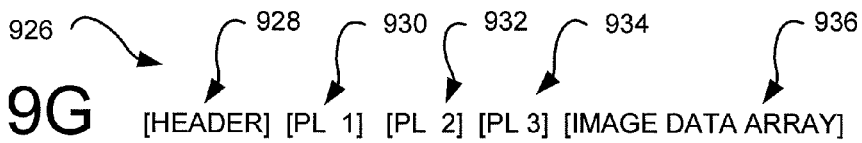

FIG. 9G illustrates a non-limiting, exemplary format of the generated multiple-palette image data file 926. The multiple-palette image data file 926 has a header 928 that defines general information about the three virtual buttons 902, 904, and 906, such as the image size. A first color palette (PAL 1) 930 defines the two colors used for pixels of the first virtual button 902. A second color palette (PAL 2) 932 defines the two colors used for pixels of the second virtual button 904. A third color palette (PAL 3) 934 defines the two colors used for pixels of the third virtual button 906. A single image data array 936 maps to locations in the first color palette 926, the second color palette 914, and the third color palette 920 for each of the pixels in the virtual buttons 902, 904, and 906, respectively.

If three separate pixel-based image information files are used for each of the virtual buttons 902, 904, and 906, the memory capacity will be relatively large. However, if the single multiple-palette image data file 926 is used, it will utilize approximately one third of the memory capacity. That is, the single multiple-palette image data file 926 is significantly smaller since a single image data array 936 is used for all three virtual buttons 902, 904, and 906.

In alternative embodiments, the header information, color palettes, and the image data array may be ordered differently that described above. Further, other information may be included in a multiple-palette image data file.

It should be emphasized that the above-described embodiments of the multiple color palette image generator 400 are merely possible examples of implementations of the invention. Many variations and modifications may be made to the above-described embodiments. All such modifications and variations are intended to be included herein within the scope of this disclosure and protected by the following claims.

The embodiments of the invention in which an exclusive property or privilege is claimed are defined as follows:

1. A method of generating a selected image that is defined by a plurality of pixels in a pixel array, and wherein the selected image is generated based on one of a plurality of color palettes, the method comprising:
    receiving image information in a single image data file, wherein the image data file is configured to be used by an image generator to generate the selected image, and wherein the image data file comprises:
        an image data array that is a pre-defined, ordered array of a plurality of elements,
            wherein each of the plurality of elements of the image data array includes a pixel location value and a color palette location value,
            wherein the plurality of elements of the image data array are configured to define a plurality of images on a pixel-by-pixel basis,
            wherein the pixel location value defines a location of each pixel in the plurality of images, and
            wherein the color palette location value of each pixel defines a location of one of a plurality of colors identified in the plurality of color palettes;
        first color palette information defining a first color palette, wherein the first color palette comprises a first plurality of colors and a color palette location value for each color in the first color palette; and
        second color palette information defining a second color palette, wherein the second color palette comprises a second plurality of colors and a color palette location value for each color in the second color palette, wherein the second color palette is different from the first color palette;
    receiving a specification, wherein the specification identifies one of the first color palette and the second color palette;
    generating the selected image using the first plurality of colors of the first color palette in response to receiving the specification identifying the first color palette; and
    generating the selected image using the second plurality of colors of the second color palette in response to receiving the specification identifying the second color palette.

2. The method of claim 1, receiving the specification comprises:
receiving a specification corresponding to one of the first color palette and the second color palette.

3. The method of claim 1, wherein each of the plurality of color palettes is identified by a unique identifier, and wherein the specification identifies one of the first color palette and the second color palette using the corresponding unique identifier.

4. The method of claim 1, wherein generating the selected image comprises:
generating an image pixel for at least one pixel of the selected image based on the pixel location value of the at least one pixel in the selected image, and based on the corresponding color palette location value that identifies a first color in the first color palette that is located in the first color palette at the color palette location value of the at least one pixel.

5. The method of claim 1, wherein at least one color and the corresponding color palette location value in the first color palette is different from another color having the same corresponding color palette location value in the second color palette.

6. The method of claim 1, further comprising:
receiving a request to generate the selected image; and
retrieving the image data array and the identified one of the first color palette and the second color palette corresponding to the requested selected image from the image data file residing in a memory.

7. The method of claim 1, wherein the specification is a first specification, wherein the selected image file is a selected first image file, and further comprising:
receiving a second specification, wherein the second specification identifies the other one of the first color palette and the second color palette that was identified in the first specification;
generating a selected second image using the first plurality of colors of the first color palette in response to receiving the second specification identifying the first color palette; and
generating the selected second image using the second plurality of colors of the second color palette in response to receiving the second specification identifying the second color palette.

8. The method of claim 7, wherein the second specification identifies the first color palette, and further comprising:
receiving the image information in the single image data file,
wherein the image data file is configured to be used by a image generator to generate the selected second image using the image data array and the first color palette information residing in the image data file.

9. A method of generating an image data file that has image information that is defined by a plurality of pixels in a pixel array, wherein the image is generated based on one of a plurality of color palettes residing in the image data file and an image data array that is a pre-defined, ordered array of a plurality of elements, the method comprising:
receiving image information corresponding to the image data array, wherein the image information comprises pixel array information, and wherein the pixel array information, for each of the plurality of pixels of the pixel array that define the image, wherein each element of the image data array comprises:
a pixel location value, wherein the pixel location value defines a location of each pixel in the image; and
a color palette location value, wherein the color palette location value of each pixel defines a location of one of a plurality of colors identified in a color palette;
receiving a specification for at least a first color palette and a second color palette,
wherein the first color palette includes information defining a first plurality of colors and a color palette location value for each color in the first color palette,
wherein the second color palette includes information defining a second plurality of colors and a color palette location value for each color in the second color palette, and
wherein at least one color and the corresponding color palette location value in the first color palette is different from another color having the same corresponding color palette location value in the second color palette;
retrieving the first color palette and the second color palette from a memory; and
storing the image data array, the first color palette, and the second color palette as a single image data file into the memory.

10. The method of claim 9, further comprising:
receiving a request to generate the image; and
retrieving the image data file from the memory.

11. The method of claim 10, wherein receiving the request to generate the image comprises:
receiving a specification corresponding to one of the first color palette and the second color palette;
retrieving the image data array and the first color palette from the image data file in response to receiving the specification corresponding to the first color palette;
generating the image using the first plurality of colors of the first color palette in response to receiving the specification identifying the first color palette;
retrieving the image data array and the second color palette from the image data file in response to receiving the specification corresponding to the second color palette; and
generating the image using the second plurality of colors of the second color palette in response to receiving the specification identifying the second color palette.

12. A method of generating an image that is defined by a plurality of pixels arranged in a pixel array, wherein the image is generated in one of a first color and a second color, the method comprising:
receiving image information in a single image data file, wherein the image data file is configured to be used at a processor system to generate the image, the image data file comprising:
an image data array that is a pre-defined, ordered array of a plurality of elements, wherein each element defines a location for each of a plurality of pixels of the image and a color palette location value;
first color palette information defining a color palette location value of the first color in a first color palette; and
second color palette information defining a color palette location value of the second color in a second color palette, wherein the color palette location value of the second color in the second color palette is the same as the color palette location value of the first color in the first color palette;
receiving, at the processor system, a specification that identifies one of the first color palette and the second color palette that is to be used to generate the image;

retrieving the image data array and the first color palette from the image data file in response to receiving the specification corresponding to the first color palette;

generating the image using the first color in response to receiving the specification corresponding to the first color palette;

retrieving the image data array and the second color palette from the image data file in response to receiving the specification corresponding to the second color palette; and generating the image using the second color in response to receiving the specification corresponding to the second color palette.

13. The method of claim 12, wherein the specification specifies one of the first color palette and the second color palette.

14. The method of claim 12, wherein the specification specifies one of the first color and the second color.

15. The method of claim 12, wherein the first color palette and the second color palette are each identified by a unique identifier, and wherein the specification specifies one of the first color palette and the second color palette using the corresponding unique identifier.

16. The method of claim 15, further comprising:

retrieving the image data array and the first color palette from the image data file in response to receiving the specification that specifies the first color palette using the corresponding unique identifier; and retrieving the image data array and the second color palette from the image data file in response to receiving the specification that specifies the second color palette using the corresponding unique identifier.

* * * * *